United States Patent
Sakamoto

(10) Patent No.: US 10,202,124 B2
(45) Date of Patent: Feb. 12, 2019

(54) ROUGH TERRAIN VEHICLE

(71) Applicant: HONDA MOTOR CO., LTD., Tokyo (JP)

(72) Inventor: Naoki Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 15/474,517

(22) Filed: Mar. 30, 2017

(65) Prior Publication Data

US 2017/0282924 A1    Oct. 5, 2017

(30) Foreign Application Priority Data

Mar. 31, 2016  (JP) ................ 2016-071039

(51) Int. Cl.
*B60W 10/02* (2006.01)
*B60W 10/10* (2012.01)
(Continued)

(52) U.S. Cl.
CPC ........ *B60W 30/1884* (2013.01); *B60W 10/02* (2013.01); *B60W 10/04* (2013.01); *B60W 10/06* (2013.01); *B60W 10/10* (2013.01); *B60W 30/18045* (2013.01); *B60W 40/105* (2013.01); *B60W 50/14* (2013.01); *B60W 2050/146* (2013.01); *B60W 2300/185* (2013.01); *B60W 2510/0208* (2013.01); *B60W 2510/0604* (2013.01); *B60W 2510/0638* (2013.01); *B60W 2510/1005* (2013.01); *B60W 2520/10* (2013.01);
(Continued)

(58) Field of Classification Search
CPC ................ B60W 10/02; B60W 10/10; B60W 2300/185; B60W 30/1884; B60W 30/18118; B60W 2540/16; B60W 2550/142

See application file for complete search history.

(56) References Cited

U.S. PATENT DOCUMENTS

| 6,679,810 B1 | 1/2004 | Boll et al. |
| 6,782,961 B1 * | 8/2004 | Ishikawa ................ B60K 28/16 180/197 |

(Continued)

FOREIGN PATENT DOCUMENTS

| JP | 2010-180850 A | 8/2010 |
| JP | 2010-180987 A | 8/2010 |

OTHER PUBLICATIONS

Office Action dated Aug. 29, 2017, issued in counterpart Japanese Application No. 2016-071039, with English translation (5 pages).

(Continued)

*Primary Examiner* — Tisha D Lewis
(74) *Attorney, Agent, or Firm* — Westerman, Hattori, Daniels & Adrian, LLP

(57) ABSTRACT

A determination unit in an ECU of a rough terrain vehicle determines a reverse running state in a case that an engine rotational speed of an engine decreases when a traveling drive force is generated in the rough terrain vehicle. Further, if the determination unit determines occurrence of the reverse running state, the ECU refers to a clutch hydraulic pressure map, and sets a target hydraulic pressure so as to decrease gradually over time.

5 Claims, 7 Drawing Sheets

(51) Int. Cl.
*B60W 30/18* (2012.01)
*B60W 30/188* (2012.01)
*B60W 10/06* (2006.01)
*B60W 40/105* (2012.01)
*B60W 50/14* (2012.01)
*B60W 10/04* (2006.01)

(52) U.S. Cl.
CPC ..... *B60W 2540/10* (2013.01); *B60W 2540/12* (2013.01); *B60W 2540/16* (2013.01); *B60W 2710/021* (2013.01); *B60W 2710/0644* (2013.01); *B60W 2720/10* (2013.01)

(56) References Cited

U.S. PATENT DOCUMENTS 8,285,436 B2* 10/2012 Yoshii ................... B60W 40/10
477/74
9,005,082 B2* 4/2015 Okamura .............. B60W 10/06
123/361

OTHER PUBLICATIONS

Office Action dated Apr. 16, 2018, issued in counterpart Canadian Application No. 2962988. (5 pages).

* cited by examiner

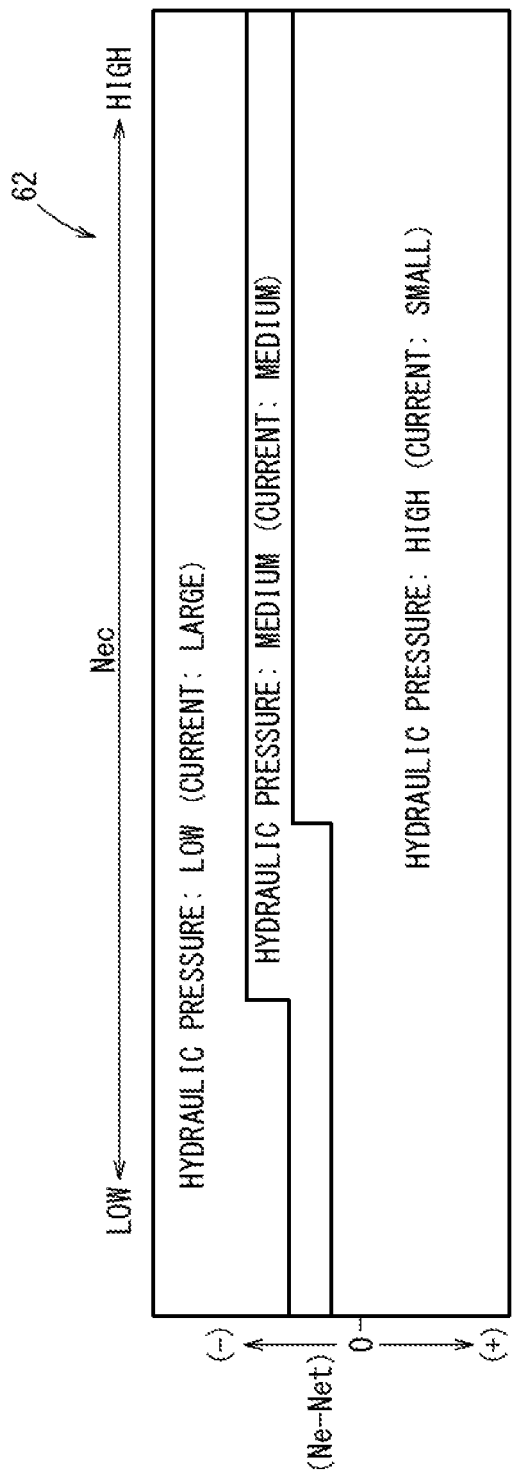

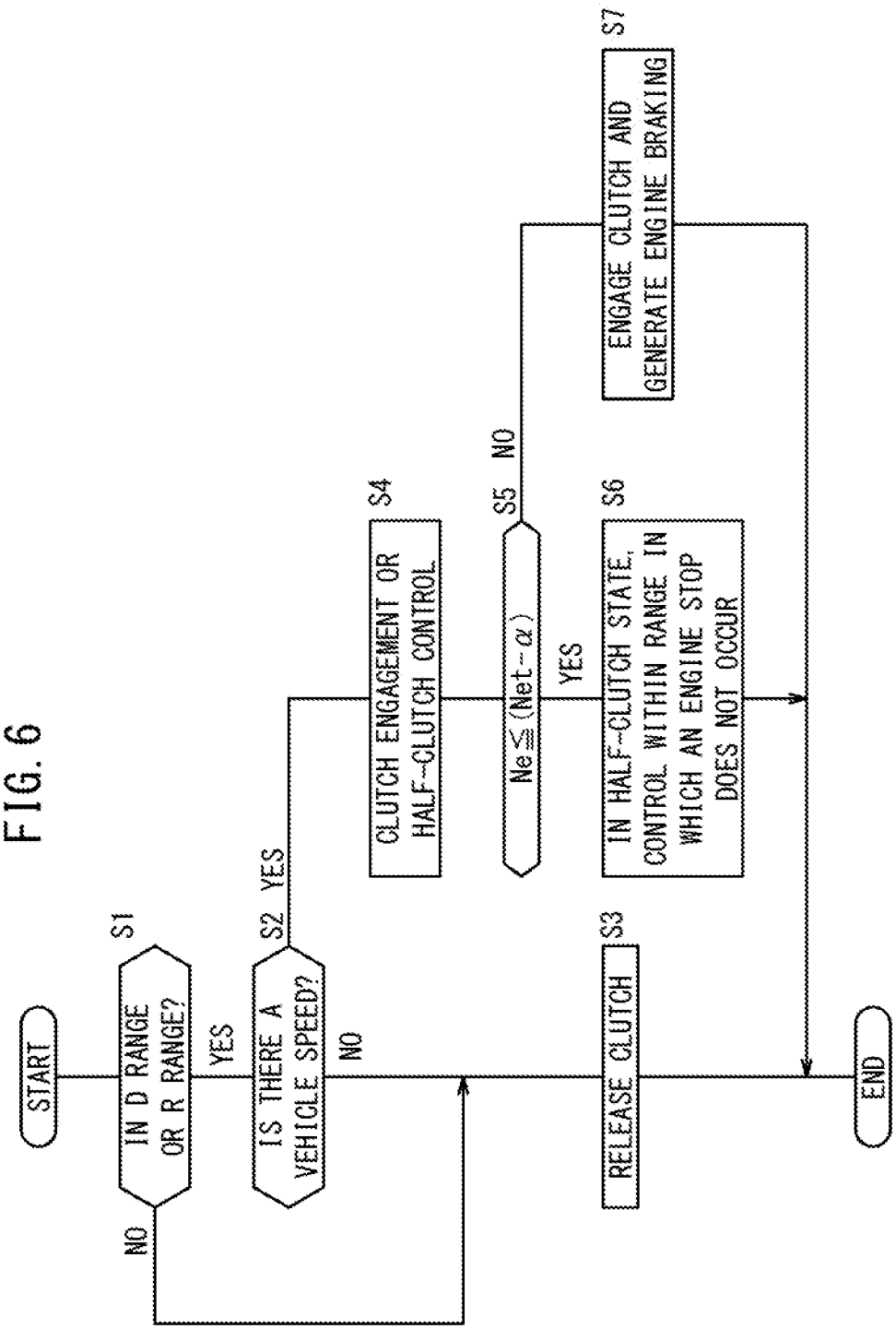

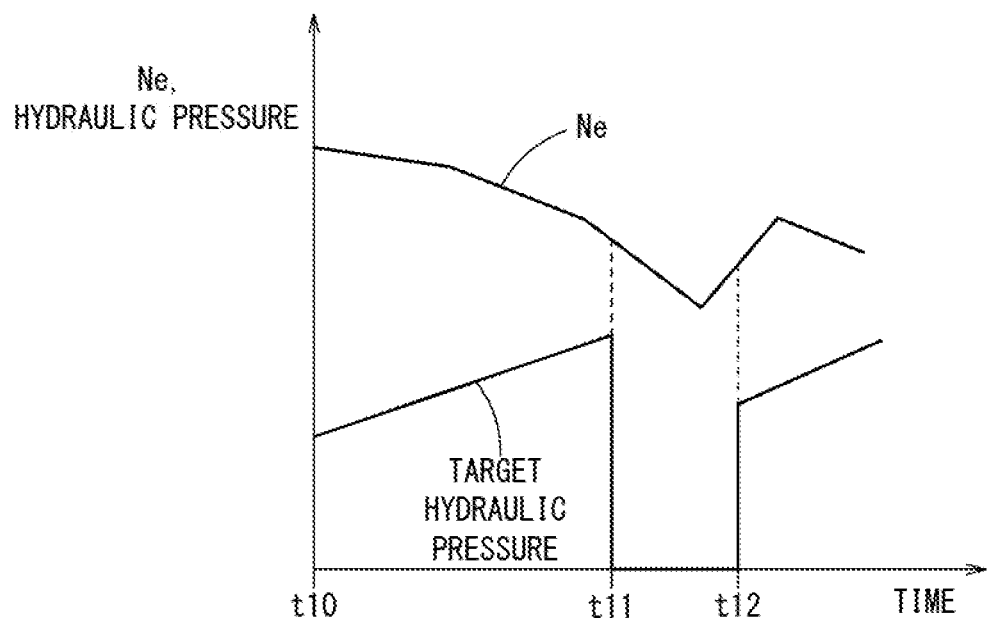
FIG. 7A PROIOR ART
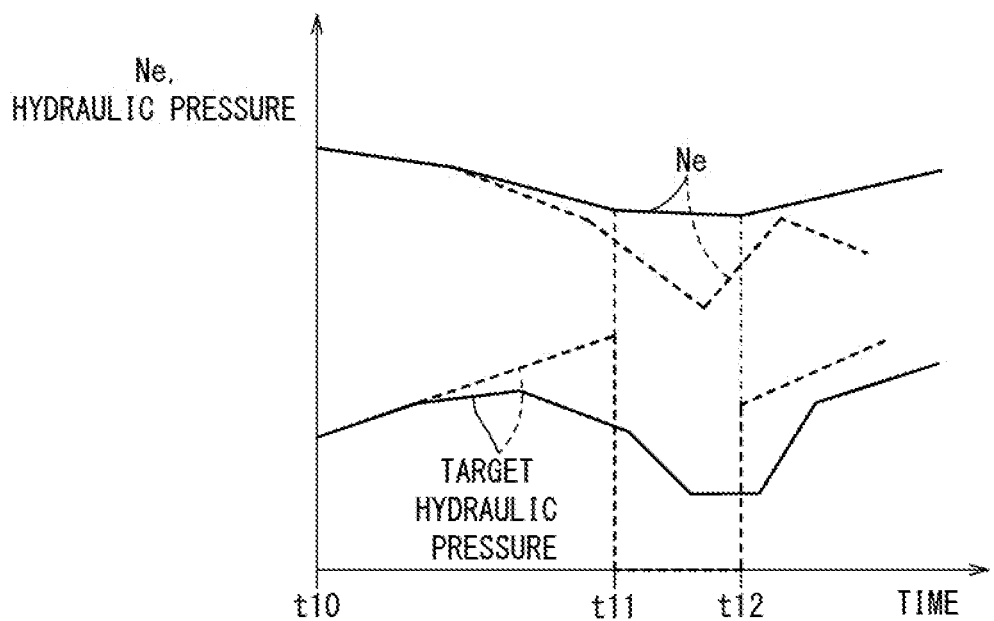
FIG. 7B

ROUGH TERRAIN VEHICLE

CROSS-REFERENCE TO RELATED APPLICATION

This application is based upon and claims the benefit of priority from Japanese Patent Application No. 2016-071039 filed on Mar. 31, 2016, the contents of which are incorporated herein by reference.

BACKGROUND OF THE INVENTION

Field of the Invention

The present invention relates to a rough terrain vehicle which is capable of determining whether or not traveling in a direction opposite to a forward/reverse command direction (i.e., a reverse running state) is taking place.

Description of the Related Art

It is known that when a vehicle which is stopped on an ascending slope starts to move uphill in an upward direction, since when the brake is released the vehicle moves downward on the uphill slope, if the driver opens the throttle by depressing the accelerator pedal, an engine stop tends to occur.

In order to prevent the occurrence of such an engine stop, as disclosed in Japanese Laid-Open Patent Publication No. 2010-180850, in a rough terrain vehicle (ATV), it is determined from a speed ratio between an input (engine output) and an output (input to the transmission) of a torque converter whether or not the vehicle is traveling in a reverse direction (i.e., is in a reverse running state), and if the vehicle is judged to be in a reverse running state, the target engine rotational speed is set to a higher value.

SUMMARY OF THE INVENTION

However, with the technology disclosed in Japanese Laid-Open Patent Publication No. 2010-180850, in order to make a judgment concerning the reverse running state, it is necessary to arrange rotational velocity detectors respectively on the input side and the output side of the torque converter, which leads to a rise in costs. Further, since the engine rotational speed is raised before the occurrence of the engine stop, the output of the engine becomes excessive.

Thus, the present invention has the object of providing a rough terrain vehicle which is cable of detecting a reverse running state at a low cost by reducing the number of sensors required to determine the reverse running state. Further, the present invention has the object of providing a rough terrain vehicle in which toughness with respect to an engine stop can be enhanced without increasing the output of the engine excessively.

A rough terrain vehicle according to the present invention is equipped with a forward/reverse movement command unit configured to issue a command for forward or reverse movement, a traveling drive unit configured to generate a traveling drive force in a direction commanded by the forward/reverse movement command unit responsive to an operation amount of an accelerator pedal, by transmitting an output of an engine to vehicle wheels, and a determination unit configured to determine whether or not the vehicle is in a reverse running state in which traveling is taking place in a direction opposite to the direction commanded by the forward/reverse movement command unit. The rough terrain vehicle further includes the following features.

First Feature: The determination unit determines the reverse running state in the case that an engine rotational speed of the engine decreases when the traveling drive force is generated.

Second Feature: The rough terrain vehicle further includes a clutch configured to transmit the output of the engine, and a control unit configured to control the clutch. In this instance, if the determination unit determines the reverse running state, the control unit refers to a clutch hydraulic pressure map in which there is indicated a relationship between the engine rotational speed and a hydraulic pressure of the clutch, and decreases the hydraulic pressure of the clutch gradually accompanying a decrease in the engine rotational speed.

Third Feature: The clutch hydraulic pressure map is a map defined by a relationship between the engine rotational speed, an estimated engine rotational speed which is estimated on the basis of a vehicle velocity of the rough terrain vehicle, and the hydraulic pressure of the clutch. In this case, within the clutch hydraulic pressure map, the hydraulic pressure of the clutch is set so as to decrease accompanying a decrease in the engine rotational speed, and to increase accompanying an increase in the estimated engine rotational speed.

Fourth Feature: Within the clutch hydraulic pressure map, the hydraulic pressure of the clutch is set so as to decrease accompanying a decrease in a difference between the engine rotational speed and a target value of the engine rotational speed in an idling state, and to increase accompanying an increase in the estimated engine rotational speed.

Fifth Feature: The estimated engine rotational speed is calculated from a rotational speed of the vehicle wheels of the rough terrain vehicle, and a gear ratio of a transmission equipped with the clutch.

According to the first feature of the present invention, during start of movement on an uphill slope, the reverse running state is determined if the engine rotational speed decreases when transitioning from a stopped state to a starting state. In this manner, since the reverse running state is easily determined merely by an increase or a decrease in the engine rotational speed, it is possible to reduce the number of sensors required for making such a determination.

According to the second feature of the present invention, when the reverse running state is determined, based on the clutch hydraulic pressure map, the hydraulic pressure of the clutch is decreased gradually accompanying a decrease in the engine rotational speed. In accordance with this feature, compared to the case of releasing the clutch at a predetermined rotational speed, since the clutch is loosened or released gradually, toughness with respect to an engine stop can be enhanced, and engine braking can be made effective without increasing the output of the engine excessively.

According to the third feature of the present invention, since the clutch hydraulic pressure map is formed from the engine rotational speed, the estimated engine rotational speed, and the hydraulic pressure of the clutch, the hydraulic pressure of the clutch can be controlled while taking into account the state of the engine and the running state of the rough terrain vehicle.

According to the fourth feature of the present invention, assuming that the difference between the engine rotational speed and the target value of the engine rotational speed in the idling state is substantially zero, both the engine rotational speed and the target value become the same rotational speed. On the other hand, if such a difference is of a negative value, it can be easily determined that the rough terrain vehicle is in the reverse running state. Consequently, it is possible to easily control the hydraulic pressure of the clutch in the reverse running state.

According to the fifth feature of the present invention, by making use of the estimated engine rotational speed, which is calculated from the rotational speed of the vehicle wheels and the gear ratio, the need to have a clutch hydraulic pressure map for each of the gears of the transmission is eliminated. As a result, the hydraulic pressure of the clutch can be controlled using a single clutch hydraulic pressure map.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is an explanatory diagram of a clutch hydraulic pressure map shown in FIG. 4;

FIG. 6 is a flowchart for carrying out an engine brake control; and

FIGS. 7A and 7B are timing charts showing temporal changes in an engine rotational speed and a target hydraulic pressure, respectively, according to a conventional technique as well as in the present embodiment.

DESCRIPTION OF THE PREFERRED EMBODIMENTS

A preferred embodiment of a rough terrain vehicle according to the present invention will be described in detail below with reference to the accompanying drawings. First, a description will be given concerning problems to be solved by the rough terrain vehicle according to the present invention. Next, an embodiment of the rough terrain vehicle will be described.

Problems Addressed by the Present Embodiment

With reference to FIGS. 1 through 3B, a description will be made concerning problems to be addressed by the present embodiment.

Figure 1:
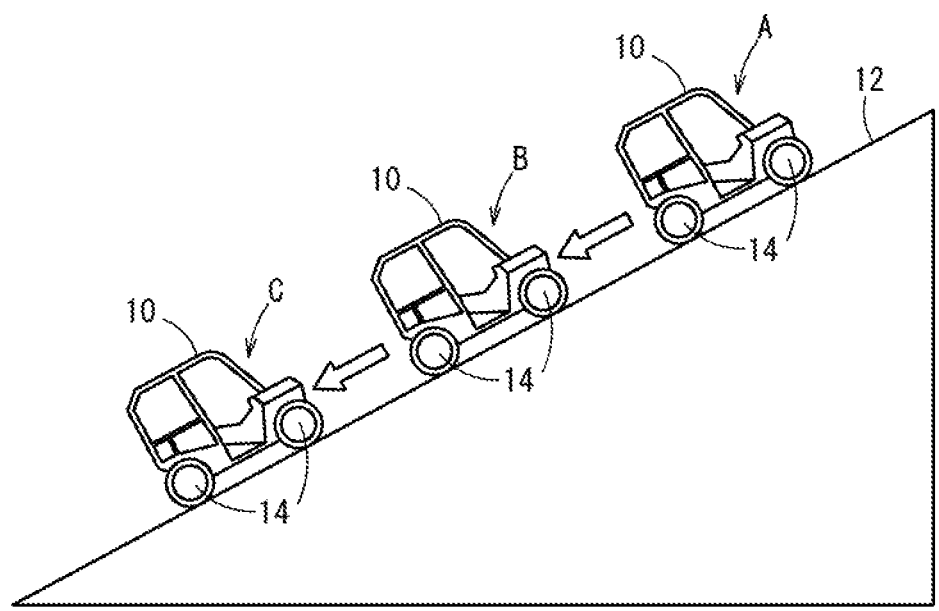
FIG. 1 is an explanatory diagram showing a problem that occurs when starting to move uphill on an ascending slope.
Figure 2:
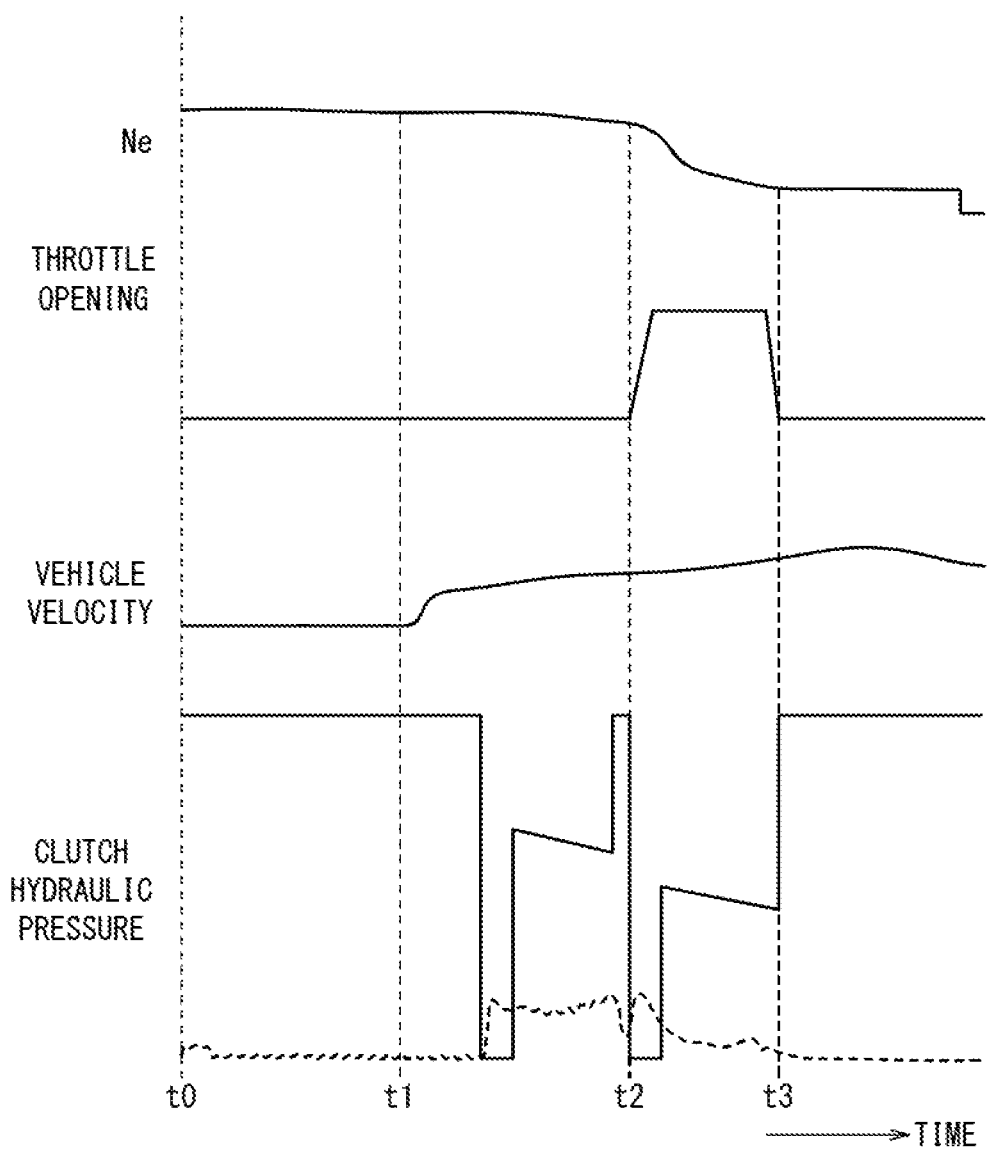
FIG. 2 is a timing chart for describing operations of a rough terrain vehicle at a time of starting to move uphill on the ascending slope.

FIG. 1 is an explanatory diagram showing problems that occur when a conventional rough terrain vehicle 10 starts to move on a sloped road 12. Further, FIG. 2 is a timing chart for describing starting operations of the rough terrain vehicle 10 shown in FIG. 1. The rough terrain vehicle 10 travels by transmitting the output of a non-illustrated engine to vehicle wheels 14 through a torque converter and a transmission.

First, at time t0, an occupant of the rough terrain vehicle 10 causes the rough terrain vehicle 10 to stop at a position A midway along a sloped road 12. In this case, an upward direction is defined as the traveling direction (forward direction) of the vehicle, and the occupant depresses the brake while remaining in the drive range, thereby stopping the rough terrain vehicle 10 at the position A. More specifically, in FIG. 1, a case is assumed in which the rough terrain vehicle 10 is ascending along an uphill sloped road 12, and the vehicle is stopped in an idling state at the position A.

In FIG. 2, a timewise change of a hydraulic pressure of a clutch that constitutes part of a transmission is also shown. In the "clutch hydraulic pressure," the solid line indicates a timewise change in a current signal that is supplied to a valve that controls the hydraulic pressure of the clutch, whereas the dashed curve indicates the actual hydraulic pressure of the clutch. At time t0, since the rough terrain vehicle 10 is stopped, the hydraulic pressure of the clutch is set to a low value, and the clutch is disengaged.

At time t1, when the occupant releases the brake, the rough terrain vehicle 10 begins to descend down the sloped road 12. More specifically, the rough terrain vehicle 10 is placed in a reverse running state in which the vehicle moves backward in a reverse direction (downward direction) opposite to the forward direction (upward direction). As a result, after time t1, the vehicle velocity V of the rough terrain vehicle 10 increases over time. It should be kept in mind that, in FIG. 2, the vehicle velocity V is not a vehicle velocity in the forward direction, but rather is a vehicle velocity in the rearward direction. Further, after time t1, due to the occurrence of the vehicle velocity V, in the rough terrain vehicle 10, it is determined that engine braking is necessary, and the clutch hydraulic pressure is increased, whereby the clutch is placed in an engaged or connected state.

Thereafter, at time t2 when the rough terrain vehicle 10 in the reverse running state has descended from the position A to the position C while passing through the position B, in order for the rough terrain vehicle 10 to start moving uphill, the accelerator pedal is depressed, and the throttle opening is increased. In this case, if the hydraulic pressure of the clutch is increased responsive to the throttle opening in order to convey the intention of the occupant, since the rough terrain vehicle 10 is traveling in reverse at that time, the engine rotational speed Ne decreases, and an engine stop occurs. As a result, at time t3, the throttle opening also is placed in a closed state.

Next, reasons as to why an engine stop occurs at the start of travel on such a sloped road 12 will be described with reference to FIGS. 3A and 3B.

Figure 3A:
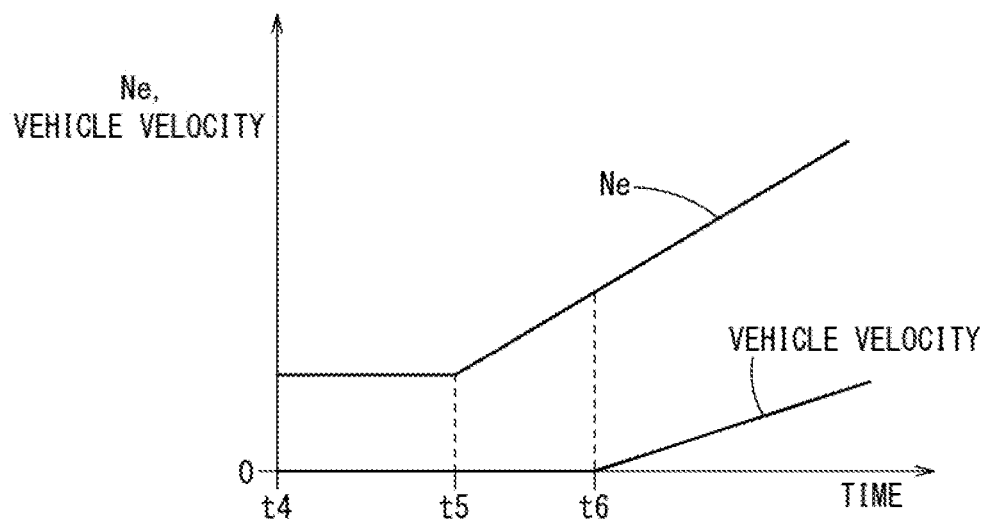
FIGS. 3A and 3B are timing charts showing temporal changes in an engine rotational speed and a vehicle velocity, respectively, during forward travel and reverse travel on the ascending slope.

FIG. 3A is a timing chart showing temporal changes in an engine rotational speed Ne and a vehicle velocity V during forward travel (when traveling in an uphill direction) on the sloped road 12.

In a time zone from time t4 to time t5, the rough terrain vehicle 10 is stopped in an idling state.

At time t5, when the occupant depresses the accelerator pedal, the engine rotational speed Ne rises over time, and the torque of the engine increases. Accompanying the rise in the engine rotational speed Ne, the difference in rotational speeds between the input side and the output side of the torque converter becomes large, and the transmission torque of the torque converter increases. Further, in accordance with the increase in the hydraulic pressure of the clutch that constitutes the transmission, the clutch is placed in an engaged or connected state.

As a result, the engine output is transmitted to the vehicle wheels 14 from the torque converter through the transmission, and after time t6 when the brake is released, the rough terrain vehicle 10 can be made to travel forward.

Figure 3B:
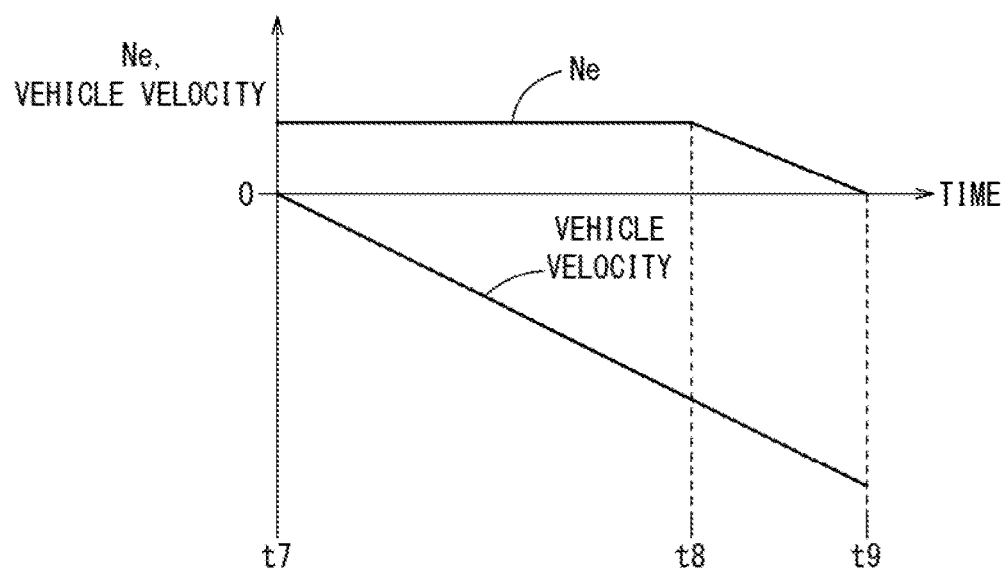

FIG. 3B is a timing chart showing temporal changes in an engine rotational speed Ne and a vehicle velocity V during reverse travel (in a reverse running state) on the sloped road 12.

When traveling in reverse, since the rough terrain vehicle 10 moves backward in the direction opposite to the original forward direction (ascending direction), after time t7, regardless of the fact that the engine rotational speed Ne remains constant, the vehicle velocity V in the downward direction increases.

In this case, in order to start forward movement of the rough terrain vehicle 10, if the clutch hydraulic pressure is increased and the clutch is placed in an engaged state, responsive to the vehicle velocity V in the downward direction, rotation in an opposite direction to that of the engine rotation is transmitted from the road surface of the sloped road 12, through the vehicle wheels 14 and the transmission, and to the output side of the torque converter.

There is no particular problem with this, so long as the rotation of the engine is greater than the rotation in the opposite direction. However, in the event that the engine rotational speed Ne is low such as in the idling state, the rotation of the engine cannot overcome the rotation in the reverse direction, and the torque converter transmits a transmission torque to the engine on the basis of the rotation in the reverse direction. In addition, since the vehicle velocity V in the downward direction increases over time, the transmission torque based on the rotation in the reverse direction also increases over time.

As a result, after time t8, by transmission of the transmission torque based on the rotation in the reverse direction to the engine, the output of the engine decreases, and the engine rotational speed Ne also decreases. Consequently, it becomes difficult for the rough terrain vehicle 10 to start moving uphill. In addition, at time t9, the engine rotational speed Ne decreases substantially to zero, whereupon an engine stop occurs.

Thus, as noted above, according to the conventional technique, it is difficult for the rough terrain vehicle 10 to start moving on the sloped road, and toughness with respect to the engine stop cannot be enhanced.

Incidentally, in the transmission, a first clutch on the side of the torque converter (a clutch on an upstream side of the output transmission from the engine) normally operates in the following manner.

(1) While the rough terrain vehicle 10 is stopped, in order to prevent creeping, engagement of the first clutch becomes disconnected (hereinafter also referred to as disengagement of the first clutch).

(2) When forward movement is initiated, the first clutch is brought into an engaged state in order to start the rough terrain vehicle 10 with the throttle valve being open (the throttle opening is greater than or equal to zero).

(3) When traveling in reverse, even if the throttle opening is approximately zero, since the vehicle velocity V in the downward direction increases, and in order to avoid the occurrence of an engine stop, the first clutch is brought into a connected or engaged state.

As noted previously, when traveling in reverse, a transmission torque is generated in the torque converter based on the reverse rotation, which causes an engine stop to occur. Therefore, as noted in item (3) above, if the first clutch is placed in an engaged state, because the rotation in the reverse direction is transmitted to the engine, it is actually more likely for an engine stop to occur. Consequently, in order to avoid the occurrence of the engine stop when traveling in reverse, it is necessary to disconnect the first clutch responsive to the decrease in the engine rotational speed Ne.

However, by adopting a method in which the first clutch is forcibly released on the basis of the decrease in the engine rotational speed Ne, a problem results in that it is difficult to ensure the responsiveness of the first clutch when switching to forward travel from the reverse running state.

Further, in order to determine quickly whether the rough terrain vehicle 10 is traveling forward or is in a reverse running (abnormal running) state, and to cope with the occurrence of an engine stop, it may be considered to employ a direction discriminating sensor such as a Hall IC or the like for discriminating the traveling direction. However, in this case, since it becomes necessary to newly incorporate the sensor in the rough terrain vehicle 10, additional costs are incurred.

Configuration of the Present Embodiment

Figure 4:
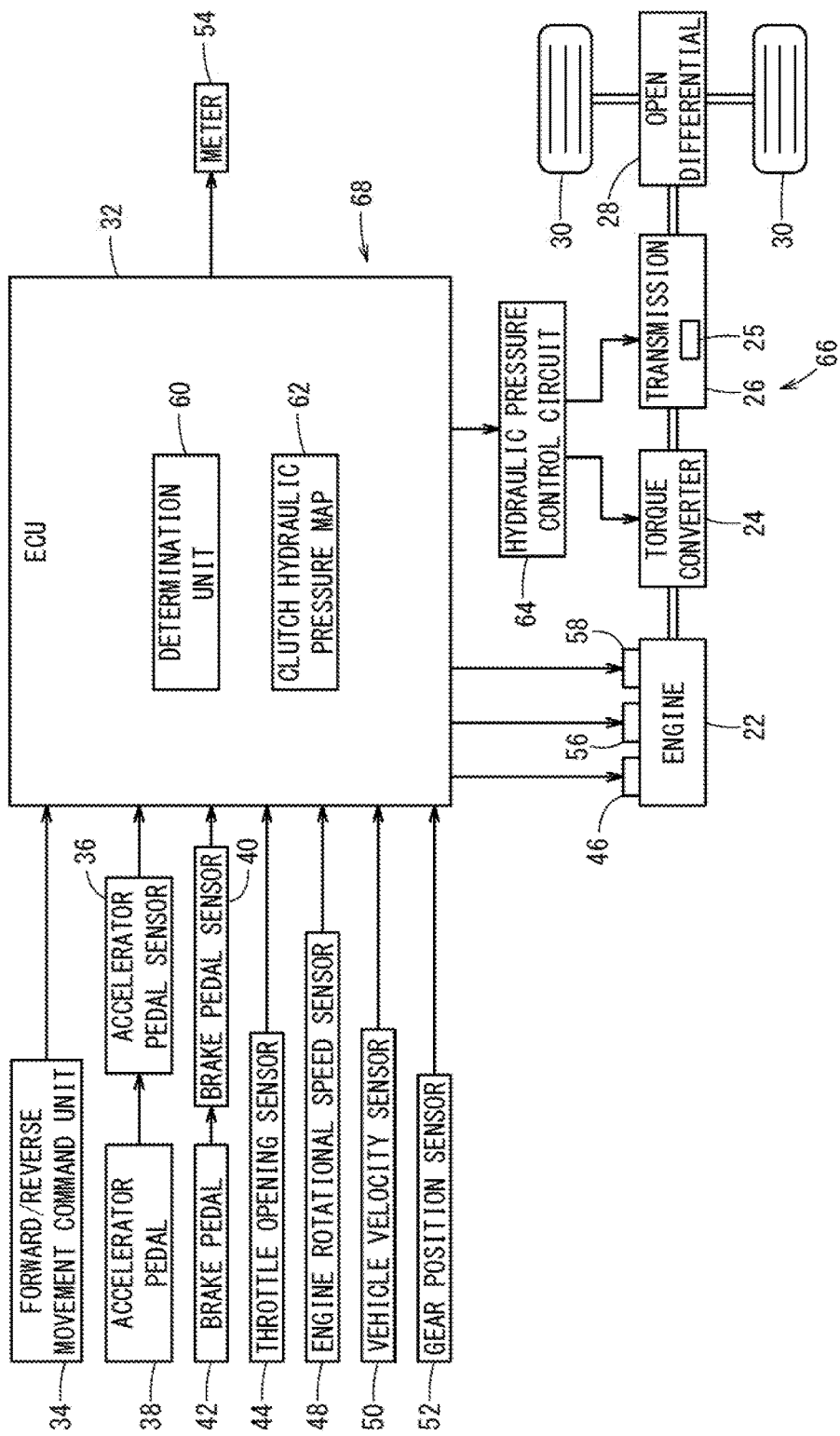
FIG. 4 is a block diagram of a rough terrain vehicle according to a present embodiment, for resolving the problems indicated in FIGS. 1 through 3B.

FIG. 4 is a block diagram of a rough terrain vehicle 20 according to the present embodiment, for resolving the problems indicated above.

The rough terrain vehicle 20 rotates vehicle wheels 30 and undergoes traveling by transmitting the output of an engine 22 to the vehicle wheels 30 through a torque converter 24, a transmission 26, which comprises a clutch 25 serving as a first clutch, and an open differential 28. Since the structures of the engine 22, the torque converter 24, the transmission 26, and the open differential 28 are well known, detailed description of such features will be omitted.

The engine 22, the torque converter 24, and the transmission 26 are controlled by an ECU 32. Detection signals from respective sensors disposed in the rough terrain vehicle 20, and command signals from respective operation units operated by the vehicle occupant are input to the ECU 32. The ECU 32 controls the engine 22, the torque converter 24, and the transmission 26 on the basis of the detection signals and the command signals. Moreover, the ECU 32 is a computational device including a microcomputer, including as elements thereof a CPU (Central Processing Unit) and a memory, etc. The ECU 32 is capable of implementing the functions described below, by reading in and executing programs recorded in the memory as a non-transitory recording medium.

More specifically, in the case that a forward/reverse movement command unit 34 such as a shift lever or the like is operated by a vehicle occupant, a command signal (sub-transmission signal) responsive to the operation result thereof is input to the ECU 32. The sub-transmission signal is a signal indicative of the shift position. In the present embodiment, the shift position includes, for example, a neutral range (N range) and a drive range (D range indicative of a D position, R range indicative of an R position).

An accelerator pedal sensor 36 detects an amount of depression of an accelerator pedal 38 by the vehicle occupant, and outputs the detected amount to the ECU 32. A brake pedal sensor 40 detects an amount of depression of a brake pedal 42 by the vehicle occupant, and outputs the detected amount to the ECU 32.

A throttle opening sensor 44 detects a degree of opening (throttle opening) of a throttle valve 46, and outputs the detected degree of opening to the ECU 32. An engine rotational speed sensor 48 detects the engine rotational speed Ne of the engine 22, and outputs the detected engine rotational speed Ne to the ECU 32. A vehicle velocity sensor 50 detects the vehicle velocity of the rough terrain vehicle 20 which corresponds to the rotational speed (vehicle wheel rotational speed) of the vehicle wheels 30, and outputs the detected vehicle velocity to the ECU 32. A gear position sensor 52 detects a transmission gear stage, which is a gear position of the transmission 26, and outputs the detected transmission gear stage to the ECU 32. The ECU 32 displays the engine rotational speed Ne, the vehicle velocity V, and the transmission gear stage on the screen of a meter 54.

On the basis of the respective detection signals from the accelerator pedal sensor 36, the brake pedal sensor 40, the throttle opening sensor 44, the engine rotational speed sensor 48, and the vehicle velocity sensor 50, the ECU 32 adjusts the degree of opening of the throttle, supplies control signals to an injector 56 whereby fuel is injected therefrom, and further supplies ignition signals to an ignition coil 58 in order to ignite a spark plug.

Further, the ECU 32 includes a determination unit 60 and a clutch hydraulic pressure map 62.

Based on the vehicle velocity V detected by the vehicle velocity sensor 50, the determination unit 60 determines whether or not a traveling drive force (a drive force for forward travel or reverse travel) is generated in the rough terrain vehicle 20. In the case that the traveling drive force is generated, the determination unit 60 investigates whether there is an increase or a decrease in the engine rotational speed Ne with respect to time. In this case, assuming there is an increase in the engine rotational speed Ne over time, the determination unit 60 readily determines that traveling (forward travel) is taking place in the direction commanded by the forward/reverse movement command unit 34. Conversely, if there is a decrease in the engine rotational speed Ne over time, the determination unit 60 determines that traveling in a reverse direction (a reverse running state indicative of reverse travel) is taking place.

As shown in FIG. 5, the clutch hydraulic pressure map 62 is a map in which there is indicated a relationship between the engine rotational speed Ne detected by the engine rotational speed sensor 48, a target value (target idle rotational speed) Net of the engine rotational speed Ne in an idling state, an estimated engine rotational speed Nec which is estimated on the basis of the vehicle wheel rotational speed and the gear ratio of the transmission 26, and a lower limit value of a control signal (current signal) supplied to a hydraulic pressure control circuit 64.

More specifically, the clutch hydraulic pressure map 62 is a map in which the vertical axis thereof is set to a difference value (Ne−Net) and the horizontal axis thereof is set to the estimated engine rotational speed Nec, and in which (the level of the current signal corresponding to) the magnitude of the hydraulic pressure of the clutch 25 is set corresponding to the difference value (Ne−Net) and the estimated engine rotational speed Nec. In FIG. 5, it is shown that levels of the target value (target hydraulic pressure) of the hydraulic pressure of the clutch 25 and the current signal can be changed in three stages, responsive to changes in the difference value (Ne−Net) and the estimated engine rotational speed Nec.

Moreover, a difference value (Ne−Net) of zero indicates that the engine rotational speed Ne and the target idle rotational speed Net are at the same rotational speed. Accordingly, if the difference value (Ne−Net) is of a positive value, the vehicle is undergoing forward travel (normal traveling), whereas if the difference value (Ne−Net) is of a negative value, the vehicle is undergoing reverse travel (is in a reverse running or abnormal running state).

In this case, in the reverse running state in which the engine rotational speed Ne is low, and the difference value (Ne−Net) is of a negative value, the hydraulic pressure of the clutch 25 is set to be low, and therefore, the current signal level becomes large. More specifically, the connection of the clutch 25 is disengaged, and the level of the current signal is set in a direction to release the clutch 25. On the other hand, during forward travel in which the engine rotational speed Ne is high and the difference value (Ne−Net) is of a positive value, the hydraulic pressure of the clutch 25 is set to be high, and therefore, the current signal level becomes small. More specifically, the level of the current signal is set in a direction to connect or engage the clutch 25 (a state in which the clutch 25 is easily gripped).

Further, the estimated engine rotational speed Nec is determined by the formula Nec=(rotational speed of vehicle wheels)×(transmission ratio), which provides estimated values of the engine rotational speed Ne for each of the transmission gears. In this case, as the estimated engine rotational speed Nec increases in value, the hydraulic pressure of the clutch 25 is set to be higher, and the level of the current signal becomes lower. More specifically, as the estimated engine rotational speed Nec becomes higher in value, the rotational speed of the main shaft of the engine 22 increases, and the rough terrain vehicle 20 is placed in the reverse running state. Therefore, the level of the current signal is set so as to bring about a state in which the clutch 25 is easily gripped.

In addition, in the case that the determination unit 60 determines that the vehicle is undergoing forward travel or is in the reverse running state, with reference to the clutch hydraulic pressure map 62, the ECU 32 specifies the lower limit value of the electric current signal responsive to the engine rotational speed Ne, the target idle rotational speed Net and the estimated engine rotational speed Nec, and sets the specified lower limit value as a value corresponding to a target value (target hydraulic pressure) for the hydraulic pressure of the clutch 25 that makes up the transmission 26. The ECU 32 supplies the current signal (lower limit value) corresponding to the target hydraulic pressure to the hydraulic pressure control circuit 64.

The hydraulic pressure control circuit 64 opens and closes a non-illustrated valve in accordance with the current signal, and adjusts the state of engagement of the clutch 25 by applying the hydraulic pressure to the clutch 25 from a non-illustrated oil tank.

In the rough terrain vehicle 20 according to the present embodiment, the engine 22, the torque converter 24, the transmission 26, the open differential 28, and the vehicle wheels 30 are constituted as a traveling drive unit 66, which generates a traveling drive force in the direction instructed by the forward/reverse movement command unit 34. Further, in the rough terrain vehicle 20, the ECU 32 and the hydraulic pressure control circuit 64 are constituted as a control unit 68 that controls the clutch 25 of the transmission 26.

Operations of the Present Embodiment

Next, a description will be given concerning operations of the rough terrain vehicle 20 according to the present embodiment. In the following explanations, as necessary, descriptions will be made with reference to FIGS. 4 and 5.

With the rough terrain vehicle 20 according to the present embodiment, in the case that a vehicle velocity V is generated in a state of forward travel or reverse travel, a need arises to apply engine braking. Therefore, with the rough terrain vehicle 20, engine braking is applied by engaging the clutch 25, or engine braking is applied while keeping the clutch 25 in a half-clutch state within a range in which an engine stop does not occur.

Thus, a description will be given in greater detail with reference to the flowchart of FIG. 6 concerning an engine brake control in the rough terrain vehicle 20.

In step S1, the determination unit 60 determines whether or not a sub-transmission signal of the D range or the R range is being supplied to the ECU 32 from the forward/reverse movement command unit 34.

If a sub-transmission signal of the D range or the R range is being supplied (step S1: YES), then next in step S2, the determination unit 60 determines whether or not there is a vehicle velocity V (whether or not an absolute value of the vehicle velocity V is other than substantially zero).

If there is no vehicle velocity V (V≈0) (step S2: NO), the determination unit 60 determines that the rough terrain vehicle 20 is stopped.

In step S3, on the basis of the determination result of the determination unit 60 in step S2, the ECU 32 decides to disengage the clutch 25 and to place the clutch 25 in a released state. In addition, the ECU 32 supplies a current signal to the hydraulic pressure control circuit 64 in order to release the clutch 25. On the basis of the current signal supplied thereto, the hydraulic pressure control circuit 64 closes a valve and stops application of the hydraulic pressure. As a result, the connection of the clutch 25 is disengaged and the clutch 25 is placed in a released state.

Moreover, in the case that a sub-transmission signal of the N range is being supplied to the ECU 32 in step S1 (step S1: NO), then on the basis of the determination result of the determination unit 60 in step S1, the ECU 32 implements the process of step S3 and places the clutch 25 in a released state.

On the other hand, if there is a vehicle velocity V (step S2: YES), the determination unit 60 determines that the rough terrain vehicle 20 is undergoing forward travel or reverse travel. In step S4, the ECU 32 receives the determination result of the determination unit 60 in step S2, and decides that the clutch 25 is placed in either one of an engaged state and a half-clutch state.

Next, in step S5, the determination unit 60 determines whether or not the engine rotation speed Ne is less than or equal to the difference between the target idle rotational speed Net and an arbitrary value α (whether or not Ne≤(Net−α)).

If the inequality Ne≤(Net−α) is satisfied (step S5: YES), the determination unit 60 determines that the rough terrain vehicle 20 is in a reverse running (abnormal running) state. In step S6, on the basis of the determination result of the determination unit 60 in step S5, the ECU 32 decides to place the clutch 25 in the half-clutch state.

In this case, the ECU 32 calculates the difference (Ne−Net) between the engine rotational speed Ne and the target idle rotational speed Net, as well as the estimated engine rotational speed Nec, and with reference to the clutch hydraulic pressure map 62, sets the level of the current signal responsive to the target hydraulic pressure, and so as to correspond with the calculated difference (Ne−Net) and the estimated engine rotational speed Nec.

In addition, when the ECU 32 supplies the current signal to the hydraulic pressure control circuit 64, on the basis of the current signal supplied thereto, the hydraulic pressure control circuit 64 controls the valve and adjusts the hydraulic pressure applied to the clutch 25. As a result, the clutch 25 is placed in a half-clutch state, and engine braking can be controlled within a range in which an engine stop does not occur.

On the other hand, if the inequality Ne>(Net−α) is satisfied in step S5 (step S5: NO), the determination unit 60 determines that the rough terrain vehicle 20 is undergoing normal travel (forward travel). Then, in step S7, on the basis of the determination result of the determination unit 60 in step S5, the ECU 32 decides to connect the clutch 25 or to place the clutch 25 in an engaged state.

In this case as well, the ECU 32 calculates the difference (Ne−Net) between the engine rotational speed Ne and the target idle rotational speed Net, as well as the estimated engine rotational speed Nec, and with reference to the clutch hydraulic pressure map 62, sets the level of the current signal responsive to the target hydraulic pressure, and so as to correspond with the calculated difference (Ne−Net) and the estimated engine rotational speed Nec.

In addition, when the ECU 32 supplies the current signal to the hydraulic pressure control circuit 64, on the basis of the current signal supplied thereto, the hydraulic pressure control circuit 64 opens the valve and applies the hydraulic pressure to the clutch 25. As a result, the clutch 25 is engaged and engine braking can be generated.

Next, a description will be given with reference to FIGS. 7A and 7B concerning differences between the conventional control and the control according to the present embodiment.

In FIG. 7A, temporal changes in the engine rotational speed Ne and the target hydraulic pressure in the conventional rough terrain vehicle 10 are shown. In this case, accompanying passage of time from time t10, the engine rotational speed Ne continues to decrease, and if there is a possibility than an engine stop may occur, the clutch is disengaged at time t11. As a result, within the time zone from time t11 to time t12, the engine rotational speed Ne temporarily decreases, and thereafter turns upward. In addition, at time t12, the clutch is once again placed in the connected or fully engaged state.

In this manner, with the conventional rough terrain vehicle 10, in order to avoid the occurrence of the engine stop when traveling in reverse, if the engine rotational speed Ne is reduced, the target hydraulic pressure is made to decrease abruptly, and in the time zone from time t11 to time t12, the clutch is temporarily disengaged. However, with such a method, since it is necessary to connect or engage the clutch by an abrupt rise in the target hydraulic pressure at time t12, responsiveness is poor when the clutch is switched from being disengaged into the engaged state.

On the other hand, in FIG. 7B, temporal changes in the engine rotational speed Ne and the target hydraulic pressure in the rough terrain vehicle 20 according to the present embodiment are shown. In FIG. 7B, solid lines representing the case of the present embodiment, and dashed lines representing the conventional technique of FIG. 7A are shown, respectively.

According to the present embodiment, the engine rotational speed Ne decreases from time t10, and if there is a possibility that an engine stop may occur, the target hydraulic pressure is made to decrease gradually. More specifically, with the present embodiment, the clutch is not disengaged due to an abrupt decrease in the target hydraulic pressure as in the conventional technique, and while the target hydraulic pressure gradually decreases, the clutch 25 transitions into a half-clutch state. As a result, within the time band from time t11 to time t12, the clutch 25 is placed in a half-clutch state.

Thereafter, at time t12, the clutch 25 is switched to the connected or fully engaged state.

In this manner, with the rough terrain vehicle 20 according to the present embodiment, in order to avoid the occurrence of an engine stop during reverse travel, (a lower limit value of the current signal responsive to) the target hydraulic pressure is set on the basis of the clutch hydraulic pressure map 62 including the target idle rotational speed Net, and the set target hydraulic pressure is decreased gradually accompanying a decrease in the engine rotational speed Ne. According to this feature, within the time zone from time t11 to time t12, the clutch 25 is maintained in a half-clutch state, and (the actual hydraulic pressure of the clutch 25 corresponding to) the target hydraulic pressure is changed smoothly. Stated otherwise, according to the present embodiment, in a reverse running state in which the engine rotational speed Ne is reduced, since the target hydraulic pressure is controlled to gradually decrease with the target idle rotational speed Net being used as a reference, sudden disengagement of the clutch 25 is avoided while suppressing the occurrence of an engine stop, and responsiveness of the clutch 25 can be assured.

In the above explanation, a case has been described in which engagement or disengagement is carried out with respect to the clutch 25, which serves as the first clutch on the side of the torque converter 24 of the transmission 26 (on an upstream side in the direction of power transmission), and engine braking is applied. According to the present embodiment, rather than the first clutch, it is also possible to effect engagement or disengagement with respect to a second clutch and a third clutch, etc., on the side of the open differential 28 (on a downstream side in the direction of power transmission), and to apply engine braking.

Advantages and Effects of the Present Embodiment

As has been described above, in accordance with the rough terrain vehicle 20 according to the present embodiment, during start of movement on an uphill sloped road 12, the reverse running state is determined if the engine rotational speed Ne decreases when transitioning from a stopped state to a starting state. In this manner, since the reverse running state is easily determined merely by an increase or a decrease in the engine rotational speed Ne, the direction of travel can be determined without incorporating a direction-discriminating sensor. As a result, it is possible to reduce the number of sensors required for making such a determination.

Further, when the reverse running state is determined, based on the clutch hydraulic pressure map 62, the hydraulic pressure (target hydraulic pressure) of the clutch 25 is decreased gradually accompanying a decrease in the engine rotational speed Ne. In accordance with this feature, compared to the case of releasing the clutch 25 at a predetermined rotational speed, since the clutch 25 is loosened or released gradually, toughness with respect to an engine stop can be enhanced, and engine braking can be made effective without increasing the output of the engine 22 excessively.

Further, since the clutch hydraulic pressure map 62 is formed from the engine rotational speed Ne, the estimated engine rotational speed Nec, and the hydraulic pressure of the clutch 25, the hydraulic pressure of the clutch 25 can be controlled while taking into account the state of the engine 22 and the running state of the rough terrain vehicle 20.

Furthermore, assuming that the difference (Ne−Net) between the engine rotational speed Ne and the target idle rotational speed Net is substantially zero, both the engine rotational speed Ne and the target idle rotational speed Net become roughly the same rotational speed. On the other hand, if such a difference (Ne−Net) is of a negative value, it can be easily determined that the rough terrain vehicle 20 is in the reverse running state. Consequently, it is possible to easily control the hydraulic pressure of the clutch 25 in the reverse running state.

Further still, with the clutch hydraulic pressure map 62, an estimated engine rotational speed Nec is used, which is calculated from the rotational speed of the vehicle wheels 30 and the gear ratio of the transmission 26. In accordance with this feature, the need to have a clutch hydraulic pressure map 62 for each of the gears of the transmission 26 is eliminated. As a result, the hydraulic pressure of the clutch 25 can be controlled using a single clutch hydraulic pressure map 62.

In the above explanation, a description has been made of a case of traveling on a sloped road. However, the present embodiment is not limited to traveling on a sloped road, but may be applied to a case of coasting, in which an external force is transmitted to the engine 22 from the vehicle wheels 30 via the open differential 28, the transmission 26, and the torque converter 24. In this case, the reverse running state can be determined from an increase or a decrease of the engine rotational speed Ne, and by reducing the target hydraulic pressure gradually when the reverse running state is determined, toughness with respect to an engine stop can be enhanced while under the operation of engine braking. Further, in the above description, although a case has been described of an application to controlling the hydraulic pressure of the clutch 25, the present embodiment can also be applied to a case of controlling the hydraulic pressure of the torque converter 24.

Although the description of the present invention has been presented above on the basis of a preferred embodiment, the technical scope of the present invention is not limited to the disclosed scope of the above-described embodiment. It will be apparent to those skilled in the art that various improvements or modifications can be made with respect to the aforementioned embodiment. Moreover, it should be evident from the scope of the claims that configurations, which are based on such improvements or modifications, also fall within the technical scope of the present invention. Further, the parenthetical reference characters, which are referred to in the patent claims, correspond with the reference characters shown in the accompanying drawings for thereby facilitating understanding of the present invention. However, the present invention should not be construed as being limited to the elements denoted by such reference characters.

What is claimed is:

1. A rough terrain vehicle comprising:
a forward/reverse movement command unit configured to issue a command for forward or reverse movement;
a traveling drive unit configured to generate a traveling drive force in a direction commanded by the forward/reverse movement command unit responsive to an operation amount of an accelerator pedal, by transmitting an output of an engine to vehicle wheels; and
a determination unit configured to determine whether or not the vehicle is in a reverse running state in which traveling is taking place in a direction opposite to the direction commanded by the forward/reverse movement command unit;
wherein the determination unit determines the reverse running state in a case that an engine rotational speed of the engine decreases when the traveling drive force is generated.

2. The rough terrain vehicle according to claim 1, further comprising:
a clutch configured to transmit the output of the engine; and
a control unit configured to control the clutch;
wherein if the determination unit determines the reverse running state, the control unit refers to a clutch hydraulic pressure map in which there is indicated a relationship between the engine rotational speed and a hydraulic pressure of the clutch, and decreases the hydraulic pressure of the clutch gradually accompanying a decrease in the engine rotational speed.

3. The rough terrain vehicle according to claim 2, wherein:
the clutch hydraulic pressure map is a map defined by a relationship between the engine rotational speed, an estimated engine rotational speed which is estimated on basis of a vehicle velocity of the rough terrain vehicle, and the hydraulic pressure of the clutch; and within the clutch hydraulic pressure map, the hydraulic pressure of the clutch is set so as to decrease accompanying a decrease in the engine rotational speed, and to increase accompanying an increase in the estimated engine rotational speed.

4. The rough terrain vehicle according to claim 3, wherein, within the clutch hydraulic pressure map, the hydraulic pressure of the clutch is set so as to decrease accompanying a decrease in a difference between the engine rotational speed and a target value of the engine rotational speed in an idling state, and to increase accompanying an increase in the estimated engine rotational speed.

5. The rough terrain vehicle according to claim 3, wherein the estimated engine rotational speed is calculated from a rotational speed of the vehicle wheels of the rough terrain vehicle, and a gear ratio of a transmission equipped with the clutch.

* * * * *